July 5, 1960

J. S. PALMER ET AL 2,943,584

IMPLEMENT CONTROL MEANS

Filed May 23, 1958

INVENTORS
John S. Palmer
Bernise J. Shager
Joseph N. Segura

Paul O. Pippel

ATTORNEY

Patented July 5, 1960

2,943,584

IMPLEMENT CONTROL MEANS

John S. Palmer, East Moline, and Bernise J. Shager and Joseph N. Segura, Moline, Ill., assignors to International Harvester Company, Chicago, Ill., a corporation of New Jersey Filed May 23, 1958, Ser. No. 737,248

7 Claims. (Cl. 111—67)

This invention relates to agricultural implements and particularly dispensers for fertilizer and the like adapted for attachment to planters, cultivators, etc. More specifically, the invention concerns liquid fertilizer attachments for implements and control means therefor.

Liquid fertilizer attachments for planters and the like are well known. The liquid is discharged from a tank carried by the frame and through a control valve which can be operated in conjunction with the raising and the lowering means for the planting tools so that fertilizer is discharged only when the tools are in operation and the valve is closed for raising the tools to transport position.

During planting it frequently happens that the machine encounters an obstruction and stalls during operation, at which time the liquid fertilizer continues to run out. To minimize this loss of fertilizer the operator actuates his lifting apparatus, usually powered by the planter ground wheels, and raises the implement to transport position to stop the flow of fertilizer. This maneuver is accomplished while the implement advances over the ground, and for several feet after the valve has closed no fertilizer is deposited. The operator must then back up and go over the same ground again, and since several feet of ground are traversed before the planter again reaches its lowered position the operator must again retrace his steps to fertilize this area. It is, therefore, desirable to be able to stop the feeding of fertilizer at any time.

The present invention has for its object the avoidance of the foregoing disadvantages and contemplates the provision of improved means for controlling the dispensing of liquid fertilizer and the like.

Another object of the invention is the provision, in a liquid dispensing attachment for an earth-working implement, of means interconnected between the tools and the dispensing apparatus for controlling the latter by the raising and lowering of the tools.

Another object of the invention is the provision, in a liquid dispensing attachment for an implement having earth-working tools, of means providing automatic opening and closing of the dispenser control means in response to lowering and raising of the tools, and optionally operable means for disabling the automatic means so that the dispenser control remains closed in either position of the tools.

Other objects and advantages of the invention will become clear from the following detailed description when read in conjunction with the accompanying drawings wherein.

Figure 1:
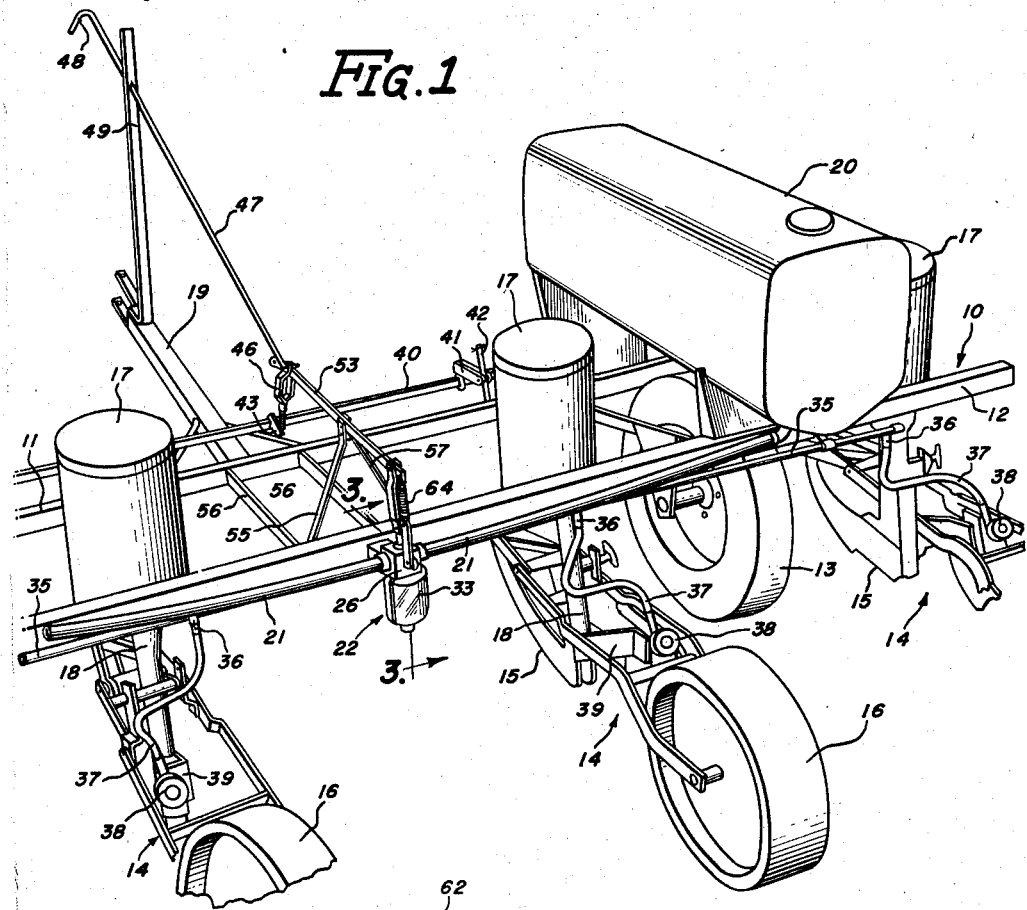
Figure 1 is a view in perspective of a portion of a planter of the trail-behind type with parts such as the lifting apparatus for the planter units removed for clarity and having mounted thereon a liquid fertilizer attachment with control means incorporating the features of this invention.
Figure 3:
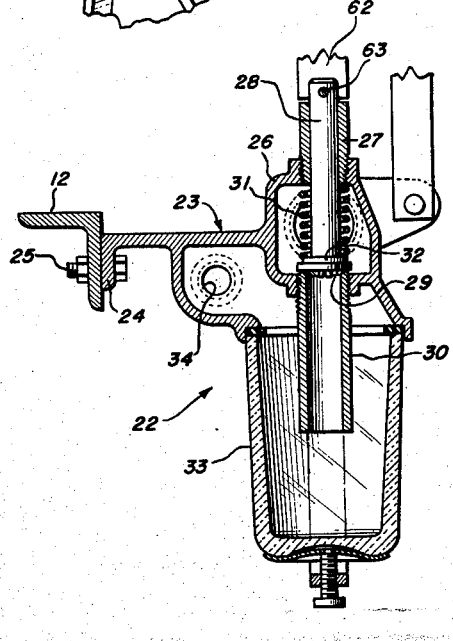
Figure 3 is a section of the control valve structure taken on the line 3—3 of Figure 1.

The invention is applicable to cultivators and other implements but is illustrated and described in its application to a multi-row planter of the trail-behind type.

In order to better illustrate the pertinent elements of the present invention, many of the components of the implement of this invention are omitted, among them being the driving means for the planter seed plates, which may be of any well known type, and the lifting apparatus for the ground units, which may be the half revolution clutch type operated from the supporting wheels of the machine. The planter frame is generally designated by the numeral 10 and includes a forward box section 11 and a rear angle bar 12, both extending transversely of the direction of travel of the implement and supported by a pair of wheels 13, only one of which is shown. The individual planting units 14, laterally spaced along the frame 10 are also of conventional construction, each including a furrow opener 15, a press wheel 16, and a seed can 17 from which seed is discharged through a tube 18 to the furrow formed by the earth-penetrating tool 15. A draft or hitch bar 19 is provided by which the implement is connected to a propelling vehicle such as a tractor.

The liquid fertilizer attachment for the planter of this invention comprises a fertilizer-containing tank 20 mounted on the planter frame at each end thereof, and only one of which is shown. Fluid drawn off by gravity from each of the tanks 20 passes through hose lines 21 to a central control valve assembly 22 comprising a housing 23 having a flanged extension 24 affixed to frame angle bar 12 by one or more bolts 25.

Forming a part of the housing 23 is a valve chamber 26 having a threaded opening in its upper end for the reception of a threaded plug 27 apertured to slidably receive a plunger 28, the lower end of which is provided with an enlarged head 29 engageable with the upper end of the tube 30 which is threaded for reception in a threaded opening provided in the lower portion of chamber 26. Head 29 is biased to engagement with and to close the upper end of tube 30 as a valve seat, by a coil spring 31, the upper end of which engages the upper end of chamber 26 and the lower end of which engages a collar 32 resting upon a head 29.

The sides of the valve chamber 26 are apertured for connection with the ends of the hose lines 21, and the fluid from tanks 20 flowing through hose lines 21 enters the valve chamber 26. Opening of the valve 22 by lifting the shaft or plunger 28 against the action of spring 31 permits the fluid to enter tube 30 and to fill the bowl 33, preferably of transparent plastic or glass, secured to the housing 23. From the valve assembly 22 fluid passes outwardly through openings 34 provided in the housing 23 and through pipes 35 connected to opposite sides of the housing 23. Pipes 35 are provided with outlets 36 at spaced locations lengthwise thereof, and each of the outlets 36 is connected by a flexible tube 37 to a metering head 38, which may be of conventional construction forming no part of this invention and preferably having openings of different size therein for regulating the quantity of fertilizer fluid discharged to the ground. The metering heads 38 are mounted in any suitable manner on the planter ground units 14, and each is preferably secured to a bracket 39 affixed to the furrow opener 15.

Raising the planter units 14 to a transport position and lowering them again to an operating position is accomplished by a mechanism, not shown and forming no part of this invention, by the rocking of a shaft 40 mounted on the planter frame and a lift arm 41 affixed to the shaft 40 and connected by a lift rod 42 in any suitable way with the ground unit 14.

To the rockshaft 40 and centrally thereof is affixed a rock arm 43 connected to a link 44 comprising a coil spring 45 anchored to the rock arm 43 and having its other end connected to a bifurcated link member 46, the upper end of which is apertured to pivotally receive the laterally bent rear end of a control rod 47 having a handle 48 at its forward end and supported by an upright 49 affixed to the forward end of the hitch 19.

Also pivotally connected to the laterally bent rear end of control rod 47 is a U-shaped lever member 50 pivoted adjacent its bight or closed end 51 on a pin 52 carried at the forward end of a movable member or beam 53.

Beam 53 is pivotally mounted medially of its ends on a transverse pivot pin 54 carried between the upper ends of a pair of downwardly diverging straps 55, the lower ends of which are mounted upon longitudinally extending braces 56 extending between and secured to the frame members 11 and 12. Additional bracing is provided by an L-shaped member 57, the foward end of which is mounted on a pin 58 mounted between straps 55 and the rear end of which is curved downwardly and connected by a pin 59 to a lug 60 forming a part of and extending rearwardly from the housing 23 of valve unit 22. The rear end of beam 53 is pivotally connected by a pin 61 to a pair of links 62, the lower ends of which are pivotally connected by a pin 63 to the upper end of plunger 28.

Figure 2:
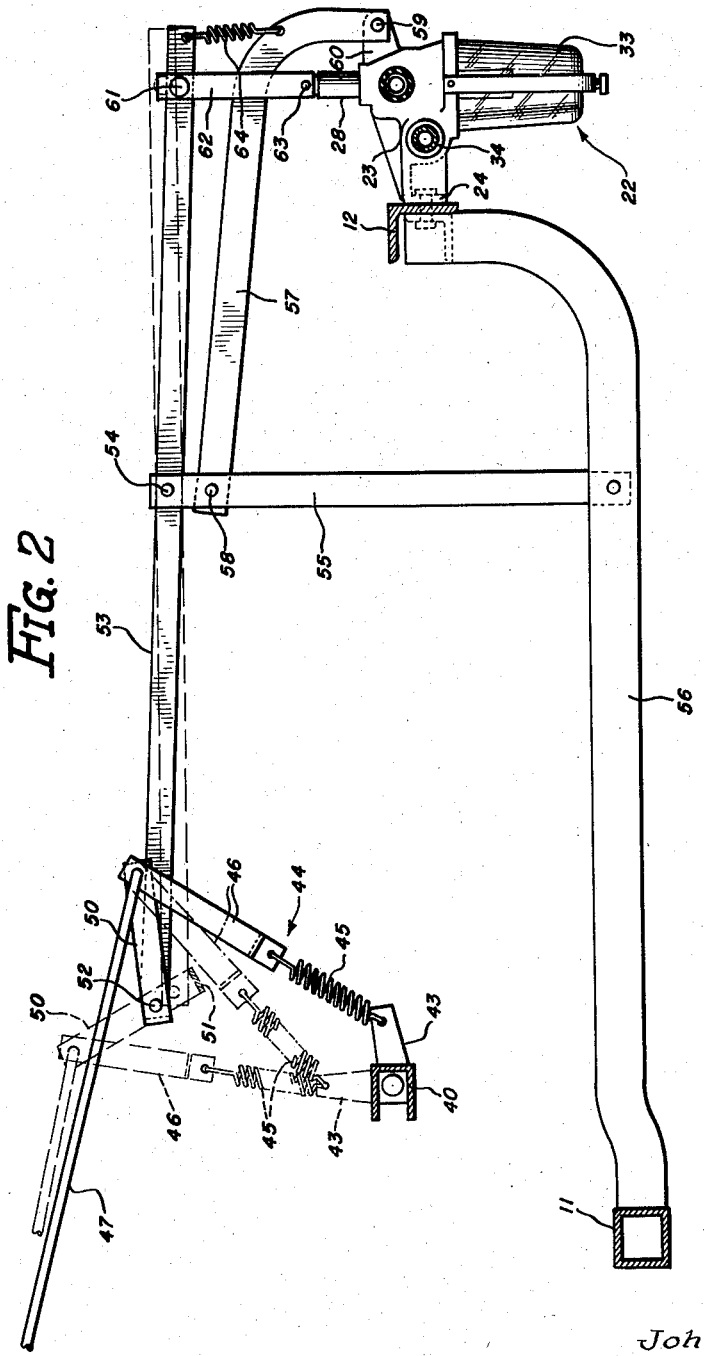
Figure 2 is an enlarged sectional view in side elevation of the valve control means regulating the dispensing of fertilizer and the interconnection of the control means with the lifting apparatus for the planter units.

At this point it should be clear that when movable member or beam 53 is in the solid line position of Figure 2, plunger 28 is seated over the opening in tube 30 closing the valve so that no fluid can pass therethrough from the supply tanks 20. Spring 31 biases the valve to the closed position shown and a helper spring 64 is connected between the rear end of brace 57 and the rearwardly projecting end of movable member 53.

In the solid line position of the parts shown in Figure 2, the bent end of rod 47 at the upper end of lever 50 engages the upper edge of movable member 53 and spring 45 of link 44 is under minmium tension. When the ground working units 14 of the planter are to be raised to their transport position, shaft 40 and arm 43 are rocked to the dotted line position of Figure 2 along with link 44. The distance between the anchor point of spring 45 to arm 43 and the connection of link member 46 to lever 50 is the same in the solid line position as in the dotted line position thereof so that movable member 53 retains its solid line position with the valve plunger 28 covering the opening in tube 30. Thus the planting unit can be raised and lowered without opening the valve for the dispensation of liquid fertilizer.

As pointed out before, in normal operation it is desirable that the flow of liquid fertilizer be automatically started when the implement is in operation and automatically stopped when it is raised to a transport position. Control rod 47 is operable by the tractor operator as a push-pull rod to swing the lever 50 about the pivot 52 between the solid and dotted line positions thereof shown in Figure 2. Lever 50 is held in the dotted line position thereof by engagement of the bight portion 51 as a stop with the under edge of movable beam member 53. With lever 50, link 44 and rock arm 43 in the dotted line position of Figure 2, the link 44 is under minimum tension by virtue of the relaxation of spring 45 and the valve remains closed. However, upon movement of rock arm 43 to the solid line position thereof with the lowering of the tools to operating position, spring 45 is stretched and movable member 53 rocks about its pivot 54 to the dotted line position thereof, raising plunger 28 and opening the valve to the passage of the fertilizer fluid to the furrow opening units.

When an obstruction is encountered or the machine stalls with the furrow openers in earth-working position and the valve open, the tractor operator merely grasps the handle 48 of push rod 47 and moves it rearwardly to rock lever 50 to the solid line position of Figure 2 to relieve the tension on link 44 and allow the valve to close, thus avoiding the loss of liquid fertilizer from the tanks.

It is believed that the operation of the control means for liquid fertilizer application will be clearly understood from the foregoing description. It should likewise be understood that the invention has been described in its preferred embodiment only and that modifications may be made in the invention without departing from the spirit thereof or the scope of the appended claims.

What is claimed is:

1. The combination with an implement having a frame and a tool adapted to be raised and lowered and a rock arm connected to said tool for raising and lowering the latter in response to the rocking of said rock arm, of a dispenser for liquid fertilizer and the like, a control valve therefor and means for actuating the control valve including a movable member mounted on the frame operatively connected to the valve, said member being movable between two positions for opening and closing the valve, connecting link means between said rock arm and said movable member for actuating the latter in response to the rocking of said rock arm, said connecting link means being effective automatically, upon rocking of said rock arm in a direction to raise said tool, to actuate said movable member to close the valve, and to actuate said movable member to open said valve upon rocking the rock arm in a direction to lower said tool, and means operatively connected to said connecting link means for shifting the latter to a position relative to said rock arm and said movable member in which the rock arm is ineffective, upon raising and lowering said tool, to actuate the movable member.

2. The combination with an implement having a frame and a tool adapted to be raised and lowered and a rock arm connected to said tool for raising and lowering the latter in response to the rocking of said rock arm, of a dispenser for liquid fertilizer and the like, a control valve therefor and means for actuating the control valve including a movable member mounted on the frame operatively connected to the valve, said member being movable between two positions for opening and closing the valve, and connecting means between said rock arm and said movable member for actuating the latter in response to the rocking of said rock arm, comprising a lever mounted on said movable member and a link connected at one end to said rock arm and at its other end to said lever and effective upon rocking said arm from a position corresponding to a raised position of said tool to a lowered position thereof to move the movable member to a position to automatically open said valve, and means for shifting said lever to a position in which said link is ineffective to move the movable member in either position of the rock arm.

3. The combination with an implement having a frame and a tool adapted to be raised and lowered and a rock arm connected to said tool for raising and lowering the latter in response to the rocking of said rock arm, of a dispenser for liquid fertilizer and the like, a control valve therefor and means for actuating the control valve including a movable member mounted on the frame operatively connected to the valve, said member being movable between two positions for opening and closing the valve, and connecting means between said rock arm and said movable member for actuating the latter in response to the rocking of said rock arm, comprising a lever mounted on said movable member and shiftable between two positions, a link connected at one end to said rock arm and at its other end to the lever for acting therethrough to move the movable member in response to rocking said arm, said link being ineffective in one position of the lever to move the movable member upon rocking said arm from one of its positions to the other.

4. The invention set forth in claim 1, wherein said connecting means includes a spring which is placed under increased tension when the rock arm is rocked in a direction to lower said tool.

5. The combination with an implement having a frame and a tool adapted to be raised and lowered and a rock arm connected to said tool for raising and lowering the latter in response to the rocking of said rock arm, of a material dispenser mounted on the frame, a control valve therefor and means for actuating said control valve including a movable member mounted on the frame operatively connected to said valve, said movable member being movable between two positions for opening and closing the valve, and means connecting said rock arm to said movable member for moving the latter in response to the rocking of said rock arm, comprising a lever mounted on said movable member and pivotable between first and second positions in engagement therewith, a link anchored at one end to said rock arm having a connection at its other end to said lever, the rocking of said rock arm between said positions corresponding to raised and lowered positions of said tool being ineffective in said first position of the lever to move said movable member to actuate the valve, and the rocking of said rock arm to raise and lower said tool being effective in said second position of the lever to move said movable member to close and open the valve.

6. The invention set forth in claim 5, wherein the anchor points of said link on said rock arm in both raised and lowered positions of said tool are equidistant from said connection of the link to said lever in the first position of the latter.

7. The invention set forth in claim 5, wherein means are provided for manually shifting said lever from one of its operating positions to the other.

References Cited in the file of this patent
UNITED STATES PATENTS

| | | |
|---|---|---|
| 1,783,689 | Angier | Dec. 2, 1930 |
| 2,550,608 | Shotwell | Apr. 24, 1951 |
| 2,578,080 | Middlestadt | Dec. 11, 1951 |